(12) United States Patent
Bishop et al.

(10) Patent No.: US 9,216,484 B2
(45) Date of Patent: Dec. 22, 2015

(54) ADJUSTABLE WORK HOLDING SYSTEM

(71) Applicants: David Allen Bishop, Center Conway, NH (US); Kevin J. Glover, Moultonboro, NH (US)

(72) Inventors: David Allen Bishop, Center Conway, NH (US); Kevin J. Glover, Moultonboro, NH (US)

(*) Notice: Subject to any disclaimer, the term of this patent is extended or adjusted under 35 U.S.C. 154(b) by 370 days.

(21) Appl. No.: 13/756,252

(22) Filed: Jan. 31, 2013

(65) Prior Publication Data

US 2014/0210150 A1 Jul. 31, 2014

(51) Int. Cl.
| | |
|---|---|
| *B25B 1/10* | (2006.01) |
| *B25B 1/24* | (2006.01) |
| *B23Q 3/06* | (2006.01) |
| *B25B 5/10* | (2006.01) |
| *B25B 5/16* | (2006.01) |

(52) U.S. Cl.
CPC ............. *B23Q 3/066* (2013.01); *B25B 5/103* (2013.01); *B25B 5/163* (2013.01); *B25B 5/166* (2013.01)

(58) Field of Classification Search
CPC .................................. B25B 1/00; B25B 1/22
USPC ...... 269/101, 290, 291, 295, 297, 289 R, 900
See application file for complete search history.

(56) References Cited

U.S. PATENT DOCUMENTS

| | | | | |
|---|---|---|---|---|
| 4,101,119 A * | 7/1978 | Speiser et al. | ................ | 269/203 |
| 4,353,561 A * | 10/1982 | Peterson | ........................ | 279/123 |
| 5,324,013 A * | 6/1994 | Marino | ........................ | 269/137 |
| 2008/0203637 A1* | 8/2008 | Li et al. | ........................... | 269/71 |
| 2010/0219573 A1* | 9/2010 | O'Rell et al. | ................. | 269/246 |
| 2012/0043711 A1* | 2/2012 | Schmidt | ........................ | 269/136 |

\* cited by examiner

*Primary Examiner* — Joseph J Hail
*Assistant Examiner* — J Stephen Taylor

(57) ABSTRACT

An adjustable work holding system can quickly adjust for different sized work pieces and can grip components with a small, about 0.100 inch, grip on the material, eliminating wasted material. Adjustable jaws can be mounted on a base plate and tightened into a desired position. Grippers are attached to the jaws and extend only about 0.100 inch over the jaws to provide a gripping surface. The grippers can be resiliently held open by a resilient member, such as an O-ring. A drive bolt for each gripper can be tightened to move the grippers closer together and grip material. The grippers provide strong holding forces and pulls the work piece down, which allows for more aggressive machining operations as compared to conventional work holding systems.

11 Claims, 4 Drawing Sheets

ADJUSTABLE WORK HOLDING SYSTEM

BACKGROUND OF THE INVENTION

The present invention relates to work holding systems and, more particularly, to a work holding system that is designed for $4^{th}$ and $5^{th}$ axis machining centers that grips on only about 0.100 inch of material.

Most conventional $4^{th}$ and $5^{th}$ axis work holding systems require a pre-op machining operation, such as formation of dovetails, to prepare the work piece to fit into the work holding system. This can take a significant amount of time.

Many conventional $4^{th}$ and $5^{th}$ axis work holding systems require a significant amount of material to grip the material. This can result in wasted material due to the need for material for gripping purposes.

Finally, many conventional $4^{th}$ and $5^{th}$ axis work holding systems do not adjust for different sizes of materials, requiring further pre-op machining to make the material fit into a single-sized work holding system.

As can be seen, there is a need for an adjustable work holding system that overcomes many of the limitations of conventional work holding systems.

SUMMARY OF THE INVENTION

In one aspect of the present invention, an adjustable work handling system comprises a base plate; a plurality of adjustment rails disposed on the base plate; mounting nuts slidably disposed within channels formed by the plurality of adjustment rails; first and second adjustable jaws, disposed atop of the plurality of adjustment rails; jaw mounting bolts fitting through each of the first and second adjustable jaws and threading into the mounting nuts, wherein tightening of the jaw mounting bolts clamps the first and second adjustable jaws against the plurality of adjustment rails; at least one gripper disposed in each of the first and second adjustable jaws; a resilient member disposed between each of the grippers and the first and second adjustable jaws; and a drive bolt operable to tighten each of the grippers against the first and second adjustable jaws.

In another aspect of the present invention, an adjustable work handling system comprises a base plate; first and second inner adjustment rails and first and second outer adjust rails disposed on the base plate; mounting nuts slidably disposed within channels formed by the adjustment rails; a serrated surface formed on an upper surface of the adjustment rails; first and second adjustable jaws, disposed atop of the adjustment rails; jaw mounting bolts fitting through each of the first and second adjustable jaws and threading into the mounting nuts, wherein tightening of the jaw mounting bolts clamps the first and second adjustable jaws against the plurality of adjustment rails; first and second grippers disposed in each of the first and second adjustable jaws; a pivot pin passing through the grippers to provide a pivot point for tightening and loosening the first and second grippers against the first and second adjustable jaws; a resilient member disposed between each of the first and second grippers and the first and second adjustable jaws; and a drive bolt operable to tighten each of the first and second grippers against the first and second adjustable jaws.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an adjustable work holding system that can quickly adjust for different sized work pieces and can grip components with a small, about 0.100 inch, grip on the material, eliminating wasted material. Adjustable jaws can be mounted on a base plate and tightened into a desired position. Grippers are attached to the jaws and extend only about 0.100 inch over the jaws to provide a gripping surface. The grippers can be resiliently held open by a resilient member, such as an O-ring. A drive bolt for each gripper can be tightened to move the grippers closer together and grip material. The grippers provide strong holding forces and pulls the work piece down, which allows for more aggressive machining operations as compared to conventional work holding systems.

Figure 1:
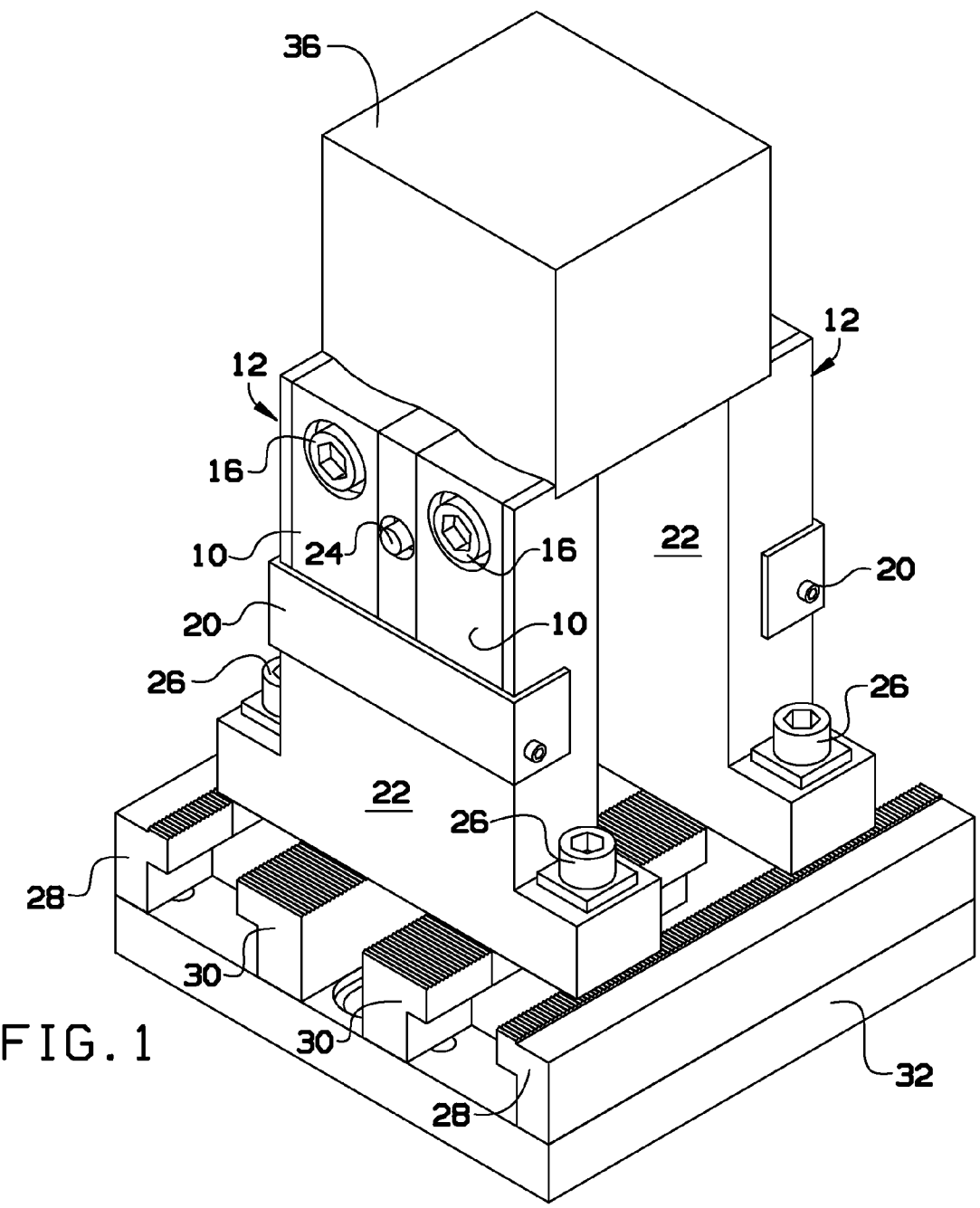
FIG. 1 is a perspective view of a work holding system, in use, according to an exemplary embodiment of the present invention.
Figure 2:
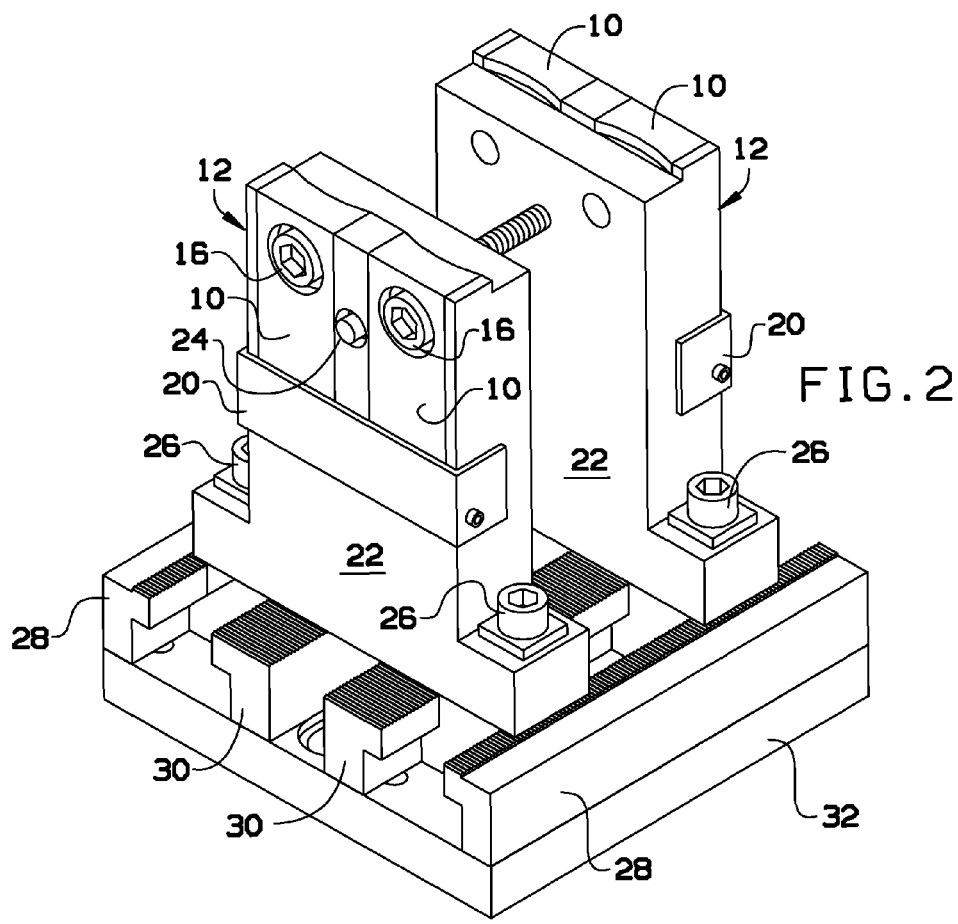
FIG. 2 is a perspective view of the work holding system of FIG. 1 with the target cut object removed.
Figure 3:
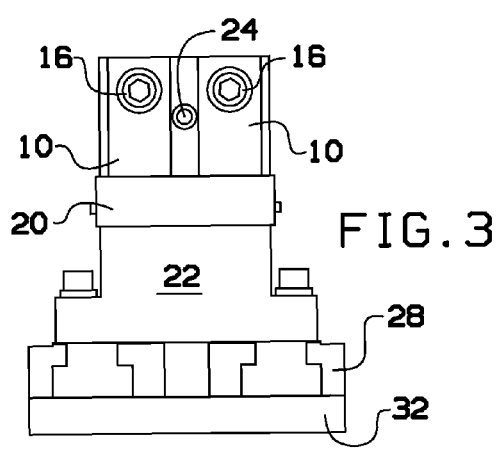
FIG. 3 is a side view of the work holding system of FIG. 1.
Figure 4:
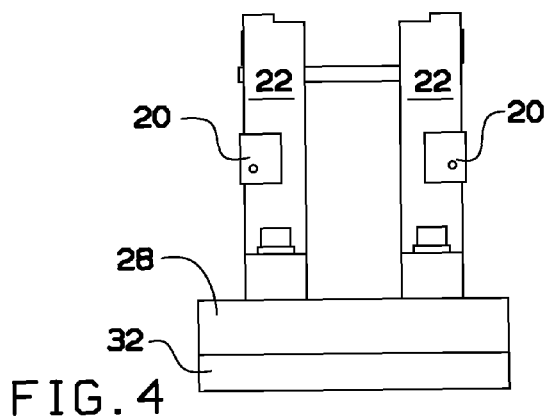
FIG. 4 is a front view of the work holding system of FIG. 1.
Figure 5:
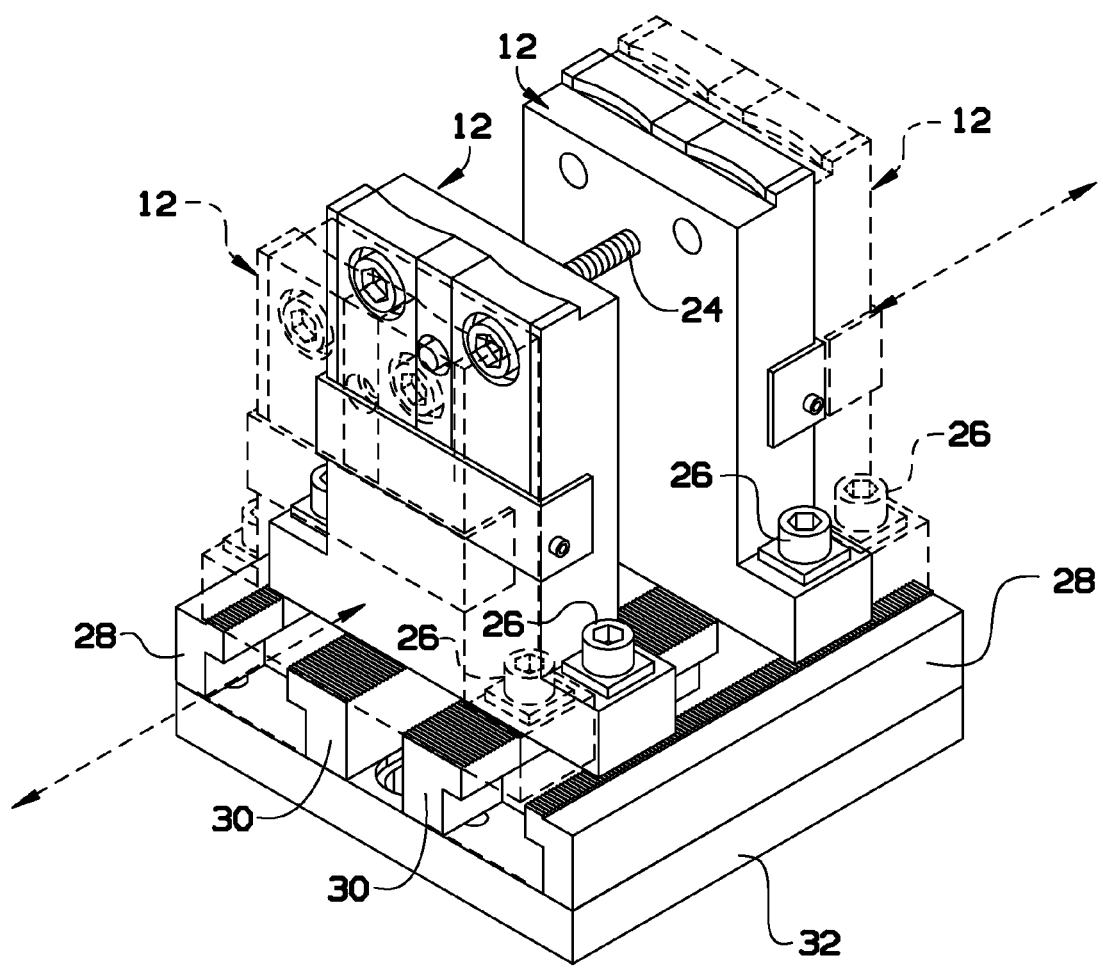
FIG. 5 is a perspective view of the work holding system of FIG. 1, illustrating adjustment of the adjustable jaws.
Figure 6:
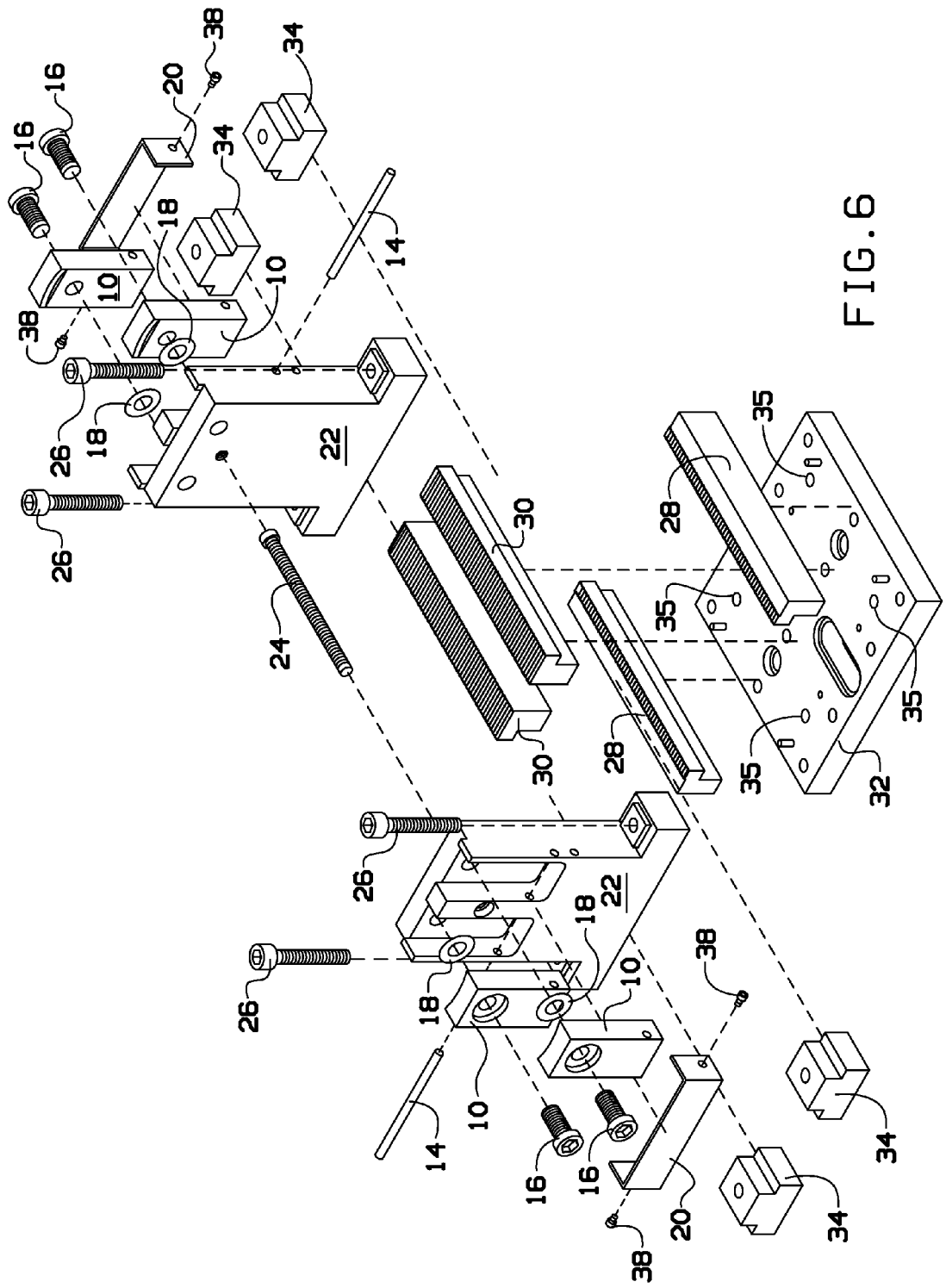
FIG. 6 is an exploded perspective view of the work holding system of FIG. 1.

Referring now to FIGS. 1 through 6, a work holding system 12 can include a base plate 32 having a plurality of hardened bushings 35 formed therein. The hardened bushings 35 can be installed on the base plate 32 to be used with diamond and taper pins to precisely locate all axes. The diamond and taper pins can be mounted on a sub-plate and the base plate 32 can be simply placed on these pins and be bolted down if precise and repeatable location is necessary. Serrated outer adjustment rails 28 and serrated inner adjustment rails 30 can be disposed on the base plate 32 to provide first and second channels into which T-nuts 34 can pass.

In some embodiments, a centering disk (not shown) can be installed in the center of the base plate 32. The centering disk can be 1.5 inches in diameter and can be used to locate the base plate 32 precisely on the $4^{th}$ and $5^{th}$ axis systems that have this feature. Most systems do include a face plate having a precise bore in the center, 1.5 inches in diameter. This allows the base plate 32 to simply be dropped on and bolted down to quickly find its center.

Adjustable jaws 22 can rest atop of the adjustment rails 28, 30. In some embodiments, the adjustable jaws 22 can have a serrated bottom surface mating with the serrated adjustment rails 28, 30 to provide adjustment of the adjustable jaws 22 along the rails 28, 30. A jaw mounting bolt 26 can pass through each side of each of the adjustable jaws 22 and into the T-nuts 34. Tightening the jaw mounting bolts 26 cause the T-nuts 34 to pull the adjustable jaws 22 against the rails 28, 30. A user can simply loosen the jaw mounting bolts 26 and move the adjustable jaws 22 along the serrated rails 28, 30 to adjust the size of the opening between the adjustable jaws 22. In some embodiments, a scale can be provided on one or more of the adjustable rails 28, 30 to show fine adjustments of the adjustable jaws 22.

Grippers 10 can mount on the adjustable jaws 22. Typically, two grippers 10 can mount on each of the adjustable jaws 22. A drive bolt 16 can pass through the gripper 10 and thread into the adjustable jaw 22. A resilient member 18, such as an O-ring, can be disposed between the gripper 10 and the adjustable jaw 22 such that by tightening the drive bolt 16, the resilient member 18 is depressed and the gripper 10 is moved into a tightened position. When the drive bolt 16 is loosened, the resilient member 18 causes the gripper 10 to move into the loosened position. A pivot pin 14 can pass through a lower end of each of the grippers 10 to provide a pivot point for the grippers 10 to pivot when the drive bolt 16 is loosened and tightened.

A cover 20 can be disposed over the grippers 10 to prevent foreign material from entering the moving parts compartment on each of the adjustable jaws 22. The cover 20 also helps secure the pivot pin 14 in position. Screws 38 can be disposed to pass through the cover 20 and into the adjustable jaw 22 to keep the cover 20 in place.

A support bolt 24 can pass through one of the adjustable jaws 22 and into the other one of the adjustable jaws 22 to prevent deflection between the jaws 22 due to force produced by the grippers 10 on an object 36. The support bolt 24 can be provided in a plurality of sizes, depending on the desired spacing between the adjustable jaws 22 on the base plate 32.

Typically, the grippers 10 can extend only about 0.100 inch to grip on the object 36. This results in less waste of material, as less material is needed for gripping the object 36 as compared to conventional work holding systems. Moreover, the object 36 can be held in place without the need to pre-form the piece for the holding system, as is conventionally performed, thus saving the user time and expense. In addition, the system of the present invention provides access to the bottom of the work piece. Most conventional systems cannot provide access to all six sides of the work piece, however, the system of the present invention can provide such access, saving time from having to perform a separate operation.

In some embodiments, the adjustable jaws 22 can be designed to be turned around 180 degrees, where the grippers 10 can be attached from the opposite side of the adjustable jaws 22. In this alternate configuration, a greater gripping surface can be realized.

It should be understood, of course, that the foregoing relates to exemplary embodiments of the invention and that modifications may be made without departing from the spirit and scope of the invention as set forth in the following claims.

What is claimed is:

1. An adjustable work handling system comprising:
    a base plate;
    a plurality of adjustment rails disposed on the base plate;
    mounting nuts slidably disposed within channels formed by the plurality of adjustment rails;
    first and second adjustable jaws, disposed atop of the plurality of adjustment rails;
    jaw mounting bolts fitting through each of the first and second adjustable jaws and threading into the mounting nuts, wherein tightening of the jaw mounting bolts clamps the first and second adjustable jaws against the plurality of adjustment rails;
    at least one gripper disposed in each of the first and second adjustable jaws;
    a pivot pin passing through the grippers to provide a pivot point for tightening and loosening the grippers against the adjustable jaws;
    a resilient member disposed between each of the grippers and the first and second adjustable jaws; and
    a drive bolt operable to tighten each of the grippers against the first and second adjustable jaws.

2. The adjustable work handling system of claim 1, wherein the plurality of adjustment rails includes first and second inner adjust rails and first and second outer adjustment rails.

3. The adjustable work handling system of claim 1, wherein the plurality of adjustment rails have serrated top surfaces.

4. The adjustable work handling system of claim 1, wherein the resilient member is an O-ring.

5. The adjustable work handling system of claim 1, wherein the mounting nuts are T-nuts.

6. The adjustable work handling system of claim 1, wherein the at least one gripper includes first and second grippers disposed in each of the adjustable jaws.

7. The adjustable work handling system of claim 1, further comprising a cover disposed over at least a portion of the grippers.

8. An adjustable work handling system comprising:
    a base plate;
    first and second inner adjustment rails and first and second outer adjust rails disposed on the base plate;
    mounting nuts slidably disposed within channels formed by the adjustment rails;
    a serrated surface formed on an upper surface of the adjustment rails;
    first and second adjustable jaws, disposed atop of the adjustment rails;
    jaw mounting bolts fitting through each of the first and second adjustable jaws and threading into the mounting nuts, wherein tightening of the jaw mounting bolts clamps the first and second adjustable jaws against the plurality of adjustment rails;
    first and second grippers disposed in each of the first and second adjustable jaws;
    a pivot pin passing through the grippers to provide a pivot point for tightening and loosening the first and second grippers against the first and second adjustable jaws;
    a resilient member disposed between each of the first and second grippers and the first and second adjustable jaws; and
    a drive bolt operable to tighten each of the first and second grippers against the first and second adjustable jaws.

9. The adjustable work handling system of claim 8, wherein the resilient member is an O-ring.

10. The adjustable work handling system of claim 8, wherein the mounting nuts are T-nuts.

11. The adjustable work handling system of claim 8, further comprising a cover disposed over at least a portion of the grippers.

* * * * *